United States Patent
Arnold et al.

[15] 3,691,650
[45] Sept. 19, 1972

[54] AUDIO/VISUAL TEACHING DEVICE

[72] Inventors: Floyd L. Arnold, Marlboro; James R. Patmore, Neptune, both of N.J.

[73] Assignee: Electronic Associates, Inc., Long Branch, N.J.

[22] Filed: Dec. 11, 1970

[21] Appl. No.: 97,082

[52] U.S. Cl................................35/8 A, 179/100.2 S
[51] Int. Cl.............................................G09b 5/06
[58] Field of Search...35/8 A, 8 R, 9 A; 179/100.2 S; 353/15; 33/18 R

[56] References Cited

UNITED STATES PATENTS

| | | |
|---|---|---|
| 3,277,588 | 10/1966 | Lynott et al.................35/9 A |
| 3,382,588 | 5/1968 | Serrell et al..................35/9 A |
| 3,522,664 | 8/1970 | Lambright et al............35/8 R |
| 3,568,321 | 3/1971 | Maps et al..................33/18 R |
| 3,594,919 | 7/1971 | Bell et al......................35/8 A |
| 2,975,672 | 3/1961 | Shields........................353/15 |

*Primary Examiner*—Wm. H. Gribe
*Attorney*—Edward A. Petko and Robert M. Skolnik

[57] ABSTRACT

The specification discloses an audio/visual teaching device capable of operation in either a programming mode or in a playback mode. In the programming mode, an operator may produce a magnetic tape having desired voice information and position information which can later be used on other of the devices so that the voice and the position will be reproduced.

7 Claims, 19 Drawing Figures

INVENTOR.
FLOYD L. ARNOLD
JAMES R. PATMORE

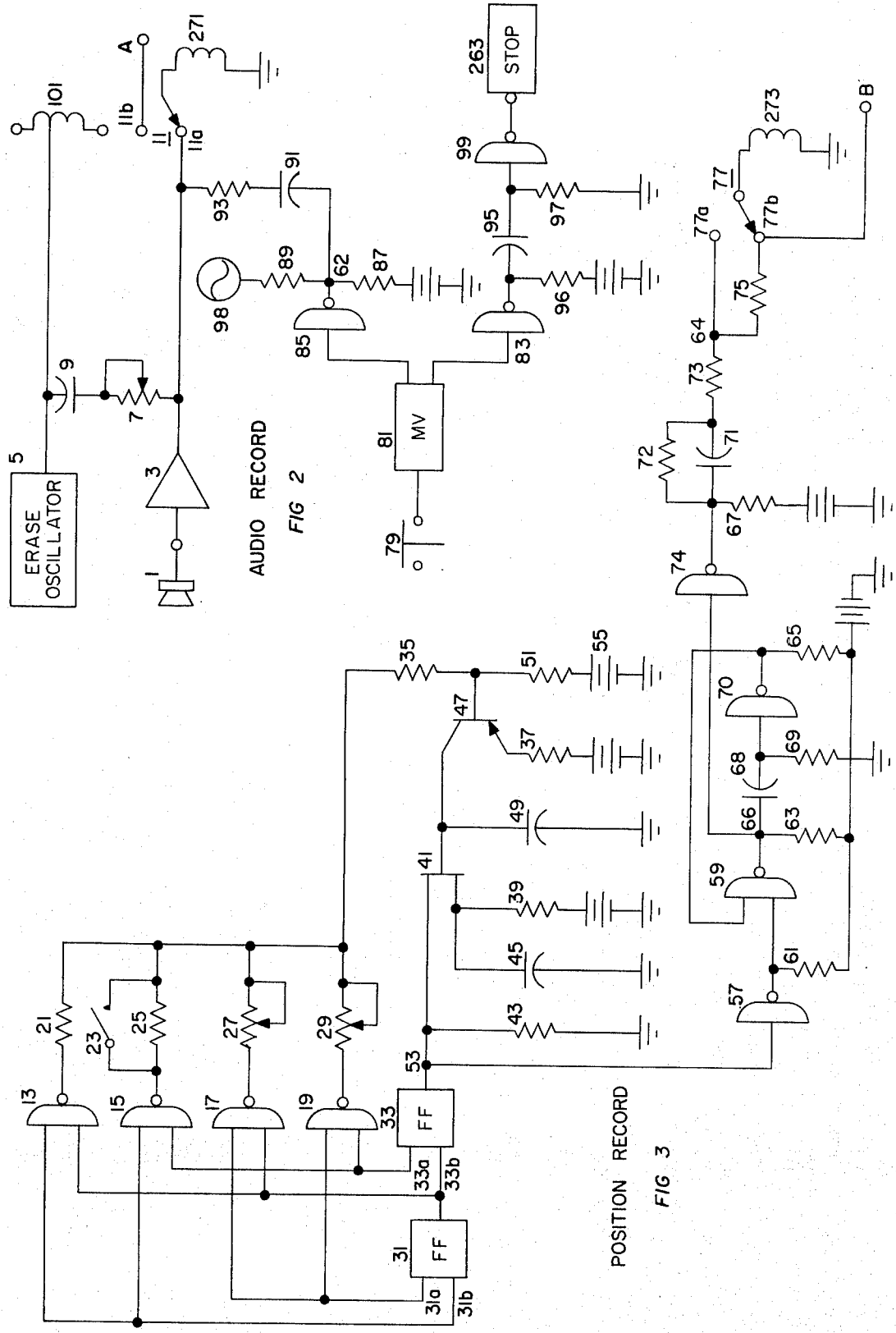

POSITION PLAYBACK

AUDIO PLAYBACK

AUDIO/VISUAL TEACHING DEVICE

BACKGROUND OF THE INVENTION

This invention relates to teaching machines; and, more particularly, relates to an improved audio/visual presentation apparatus which is capable of preparing programmed lesson plans and reproducing those prerecorded lessons.

DESCRIPTION OF THE PRIOR ART

The prior art includes many types of information presentation devices, teaching machines, slide projectors, and related devices; and these may utilize any of a number of different types of audio presentation and/or visual information presentation. Thus, various methods of individual student pacing and reinforcement are carried out with various combinations of recording and storage techniques with some of the recently proposed methods requiring cooperative association with extensive computer installations. Generally speaking, the prior art systems are characterized by expensive construction and the requirement of lesson materials, i.e. audio and visual recordings, which are expensive to compose, modify, and update. Prior work in the field is also intended to place little emphasis on compactness and portability, such attributes being deemed secondary to the obtaining of more extensive and intricate teaching and control functions.

SUMMARY OF THE INVENTION

The present invention contemplates an information presentation system which is capable of presenting oral information and visual information in combination. In a more limited aspect, the invention consists of housing which includes a frame having mounted therein a moveable light, and electronics for driving the light in accordance with a desired preprogrammed instruction set. Coincidentally, recorded with the various positions of the light, are audio statements concerning the nature of the item under investigation. Various control features have been included to enable various instructional flexibility with respect to the preprogrammed course of instruction and the student response time.

OBJECTS OF THE INVENTION

It is an object of the present invention to provide a compact, low-cost oral and visual presentation device which is relatively simple to load and control and which is extremely reliable in operation. It is another object of the present invention to provide a programmable teaching machine having playback and editing features. Other objects and advantages of the invention will be evident in the following detailed description when read in conjunction with the accompanying drawings which illustrate the invention.

BRIEF DESCRIPTION OF THE DRAWINGS

FIG. 2 is a schematic diagram of the audio record circuitry used in the invention;

FIG. 3 is a schematic diagram of the position record circuitry in the invention;

FIG. 1 is an isometric view of the teaching machine of the present invention. More particularly, the teaching machine shown generally at reference numeral 2 has a non-reflecting plastic screen 4 mounted on the face thereof. A paper drawing 38 is mounted on screen 4. The drawing may have any kind of printed indicia thereon, it being the object that the audio narrative information be descriptive of the subject matter on the drawing. Numeral 6 shows a suitable aperture for receiving a magnetic cassette type tape handler which has recorded thereon audio and position information for the student. Various control functions are provided for the student and the programmer. Numeral 8 denotes microphone and headphone jacks which are provided at the face of the teaching machine. More particularly, during the programming mode, the microphone will be connected in the appropriate microphone jack and during the instructional or playback mode headphones will be inserted in the appropriate headphone jacks.

Figure 1:
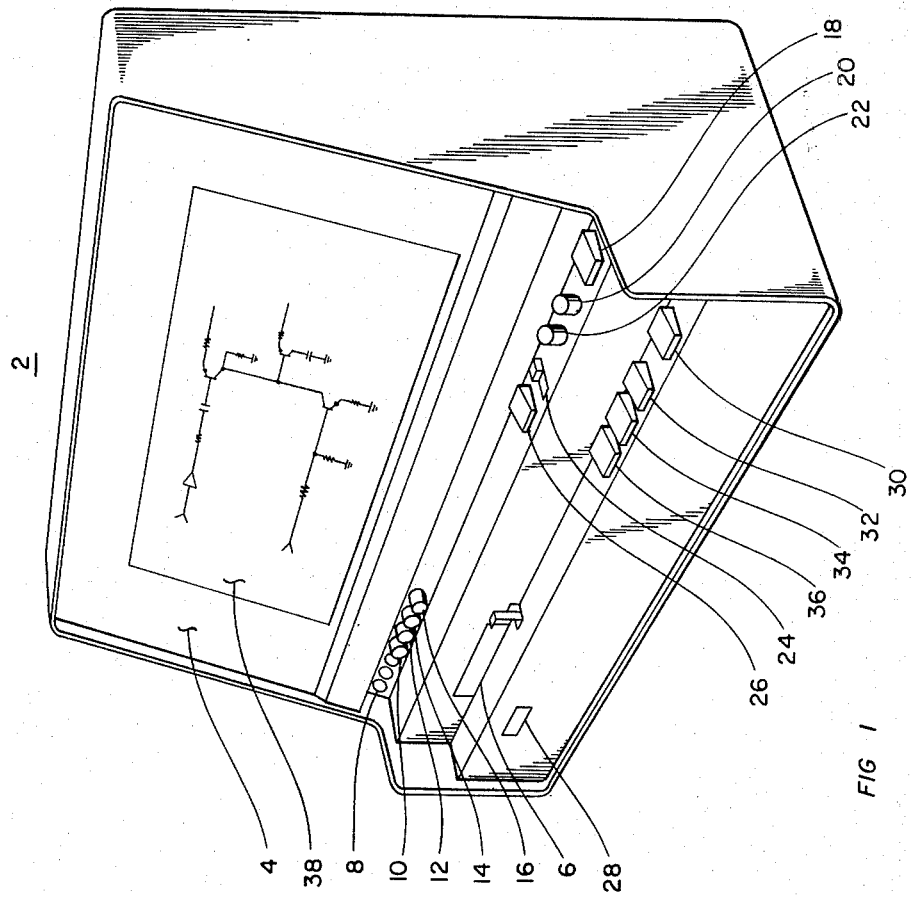
FIG. 1 is an isometric view of the device according to the invention.

Volume control for the teaching machine is provided by knob 10. Numeral 12 is a light intensity control permitting the adjustment of the lamp intensity which is necessary as a function of the ambient light conditions and the opacity of the paper document 38 which is affixed to the non-reflecting surface 4. Numerals 14 and 16 are adjustment controls which enable the student to finely adjust the position of the light to compensate for any misalignment of the drawing 38 on the face 4 of the teaching machine. Numeral 34 is the "play" control button which runs the tape at normal speed.

The student controls are denoted by numerals 30, 32, 34, and 36. Numeral 30 is "pause" control which is used by the student to stop the program and is used in the programming mode to position the light pointer before commencing the relevant narrative. Numeral 32 provides a high-speed advance of the tape, while numeral 36 is a high-speed rewind of the tape. Numeral 28 represents the face of the counter to indicate the length of tape in the cassette expended as is the customary practice. On-off control for the teaching machine is provided by proper insertion of the cassette in the space 6 provided. The teaching machine is powered only when the cassette is properly placed.

Button 26 places the teaching machine in the programming mode. Control for the pointer light during the programming mode is provided by switch 24 which records on the tape a pointer on-off control signal. Numeral 20 constitutes the vertical position control knob which is used during the programming mode to position the pointer light in the vertical axis, while numeral 22 is the horizontal position control knob used to position the pointer light in the horizontal axis during the programming mode. Numeral 18 denotes the so-called "auto-pause" record switch which is used to insert an automatic pause into the program. The system resumes narration when the student positions the pen correctly or depresses the play control, which will be described below. U.S. Pat. No. 3,568,321 shows a suitable mechanical arrangement for moving a light in the x–y planes.

In FIG. 2, numeral 1 denotes a microphone into which, in the programming mode, the audio portion of the lesson to be presented is recorded. Microphone 1 is connected via an amplifier 3 to a two-position switch 11. Switch 11 will be seen to disconnect the microphone from the recording head 271 during the non-programming or playback mode. For the present, suffice it to say that switch 11 has contacts 11a and 11b, which are connected to terminal A and to recording head 271. An erase oscillator 5 is coupled to erase head 101 and also to the output of amplifier 3 via a bias level adjusting potentiometer 7 and DC isolation capacitor 9. More particularly, potentiometer 7 and capacitor 9 provide the proper bias for the magnetic recording of the audio information supplied from microphone 1.

A pulse width coding technique is utilized for the positional information which is recorded on the magnetic tape. More particularly, in FIG. 3, a unijunction transistor 41, which, with its associated components resistors 39 and 43 and capacitor 45, will be seen to constitute a free-running relaxation oscillator, is connected to produce a positive pulse at point 53. This positive pulse is connected to trigger a first flip-flop 33 causing this flip-flop to change the state of its outputs. Flip-flop 33 in conjunction with flip-flop 31 constitute a binary counter whose output changes as a function of the occurrence of a pulse from the unijunction oscillator. By way of example, at an initial state prior to the appearance of any pulse from the unijunction oscillator, output line 33a of flip-flop 33 will be assumed to be at logic one level and output line 33b of flip-flop 33 will be at logic zero level. Output lines 31a and 31b are high and low respectively. In this condition, AND gate 19 is on thus placing resistor 29 in series with resistor 35 thereby controlling the rate of charge of capacitor 49. More particularly, capacitor 49 charges through transistor 47 up to the breakdown voltage of the unijunction oscillator via normally conducting transistor 47. When the oscillator fires, capacitor 49 will again charge at a rate proportional to whatever of resistors 21, 25, 27 or 29 are connected in the circuit with resistor 35.

Upon the occurrence of another pulse from unijunction oscillator 41, the binary counter including flip-flops 33, and 31 change states such that AND gate 17 is now conducting and so on sequentially rendering AND gates 15 and 13 conducting in turn. Resistors 27 and 29 which are seen to be adjustable potentiometers, which as will be later described, are manipulated by the operator to introduce X and Y position information into the coded position signal. Resistor 25 is shown as activated or shortened as the case may be by switch 23. Switch 23 represents control of the Z or light on-off information which is also manipulated by the operator and coded into the position signal. Resistors 25, 35 and 51, along with voltage source 55, constitute a voltage divider network for biasing transistor 47. Resistor 37 determines the amount of current flowing through transistor 47 proportional to the voltage by the junction of resistor 35 and 51.

Resistor 21 produces a synchronizing pulse which acts as a reference pulse. The interval of time between the synchronizing pulse controlled by the output of AND gate 13, and the first informational pulse (y) positional information produces a coding for the positional channel of the teaching machine.

To summarize the operation of the coding system employed in the present invention, a unijunction oscillator is continuously producing constant interval pulses when the teaching machine is in the programming mode. Manipulation of x, y, and z (light on-off) controls change the interval between the pulses. Sequentially, therefore, a series of four pulses variably spaced as a function x, y, and z positional controls are produced and, as will be later described, detected by an interval-sensing arrangement for producing corresponding positional changes on the face of the teaching machine during the playback or instructional mode.

Figure 6:
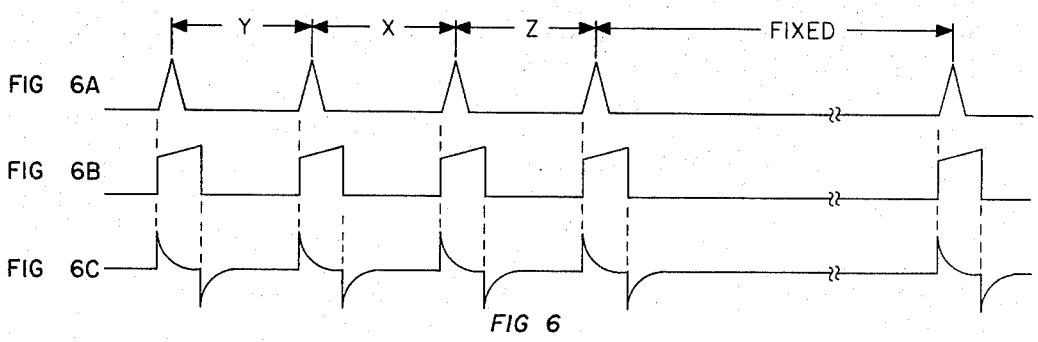
FIGS. 6–8 are diagrams of various waveforms at selected points in FIGS. 2–5.

The output of the coding arrangement, taken from point 53 (FIG. 6A) is connected to a conventional logical one-shot arrangement which includes AND gates 57, 59, and 70, resistors 61, 63, 69 and 65, and capacitor 68. This circuit arrangement produces the output at point 66 (FIG. 6B) which consists of shaped pulses of spacing proportional to the spacing of the output of the coding arrangement taken from point 53. The shaped pulses are fed to a level shifting arrangement consisting of inverter 74 capacitor 71 and resistors 67 and 72. More particularly, the voltage pulses properly shaped from point 66 are converted to a current swing for recording on the magnetic recording head. In the preferred embodiment, the pulses from point 66 vary from plus 9 volts to 0. The value of the voltage source connected to resistor 67 is plus 9 volts DC. Thus, at point 64, a differentiated signal (FIG. 6C) varying between plus 4.5 volts and minus 4.5 volts is produced. This constitutes the sharp spike necessary for recording on the tape. These current pulses are connected to the record head 273 via contact 77a of relay 77. In the record or programming mode, relay 77 would be opposite the position shown; that is, the output from point 64 would be connected directly to the recording head 273 via contact 77a. In addition, this output would be conducted to the positioning amplifiers at point B to be described later via large valued resistor 75 and contact 77b of relay 77. This serves to enable the operator to visually locate the light pointer during the programming mode so that the position being programmed on the tape is simultaneously visually presented to the operator.

During the playback mode, relay 77 is placed in the position shown so that the output of magnetic recording head is directly connected to the system positioning amplifiers at point B.

Figure 7:
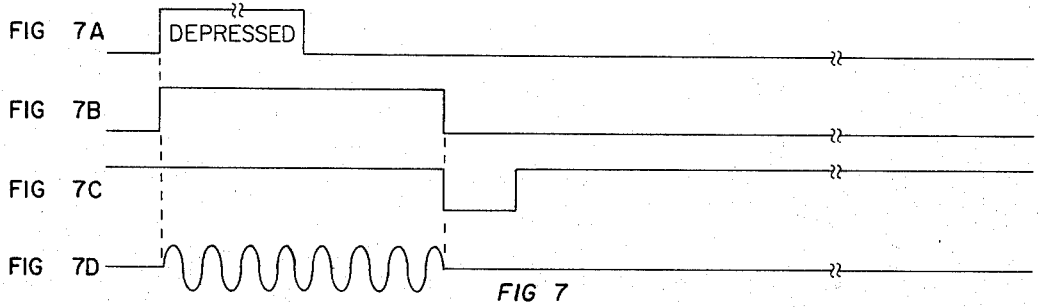

The present invention also includes a feature known as "auto pause" which enables the operator to stop the programming (i.e. the tape motion) for a fixed period of time. This period of time may be used for the student to contemplate the prerecorded information just previously reported, or, to enable the student to respond to a question that has been asked by the use of the answer pen to be described later. The auto pause includes a push-button 79 (FIG. 7A) which controls the firing of a monostable multivibrator 81 (FIG. 7B). The output of the multivibrator is connected to inverting gates 83 and 85. The channel including gate 83 generates a stop command for the tape motion. More particularly, the output of gate 83 is connected to capacitor 95 and to gate 99. Resistors 97 and 96 are provided in shunt for capacitor 95. More particularly, capacitor 95 is charged for the duration of the output of the monostable multivibrator, and discharged through resistor 97 for a fixed period of time. This is nothing more than a conventional differentiating circuit producing the stop command pulse (FIG. 7C). Thus, the stop command is delayed until the trailing edge of the monostable pulse (FIG. 7B).

During the monostable interval, the channel including inverter gate 85 serves to place on the recording tape a 60 cycle AC signal. More particularly, the output of gate 85 is connected to the juncture 62 (FIG. 7D) of resistors 89 and 87. The monostable output is normally high, thus causing an effective ground at juncture 62. Resistor 87 is connected to a source of voltage while resistor 89 is connected to a source of 60 cycle AC 98. When the monostable fires, the ground is removed and the series connection of capacitor 91 and resistor 93 feeds the 60 cycle AC to the output of the audio channel for recording. When the input to gate 85 is low, the output is high allowing the AC signal to be applied to the recording head via resistor 89, capacitor 91 and resistor 93.

Another feature of the invention is a flasher control for the light when the system is in the record or programming mode. Shown in FIG. 4, the flasher includes a unijunction oscillator consisting of unijunction transistor 265, resistors 269 and 271 and capacitor 273. The output of the oscillator is coupled to the pointer lamp drive circuit 143 via a logical OR gate consisting of diodes 267 and 139. Thus, during the programming mode, when the lamp is not illuminated under program control it is made to flash continuously so that the programmer can ascertain its position at all times.

PLAYBACK

Figure 4:
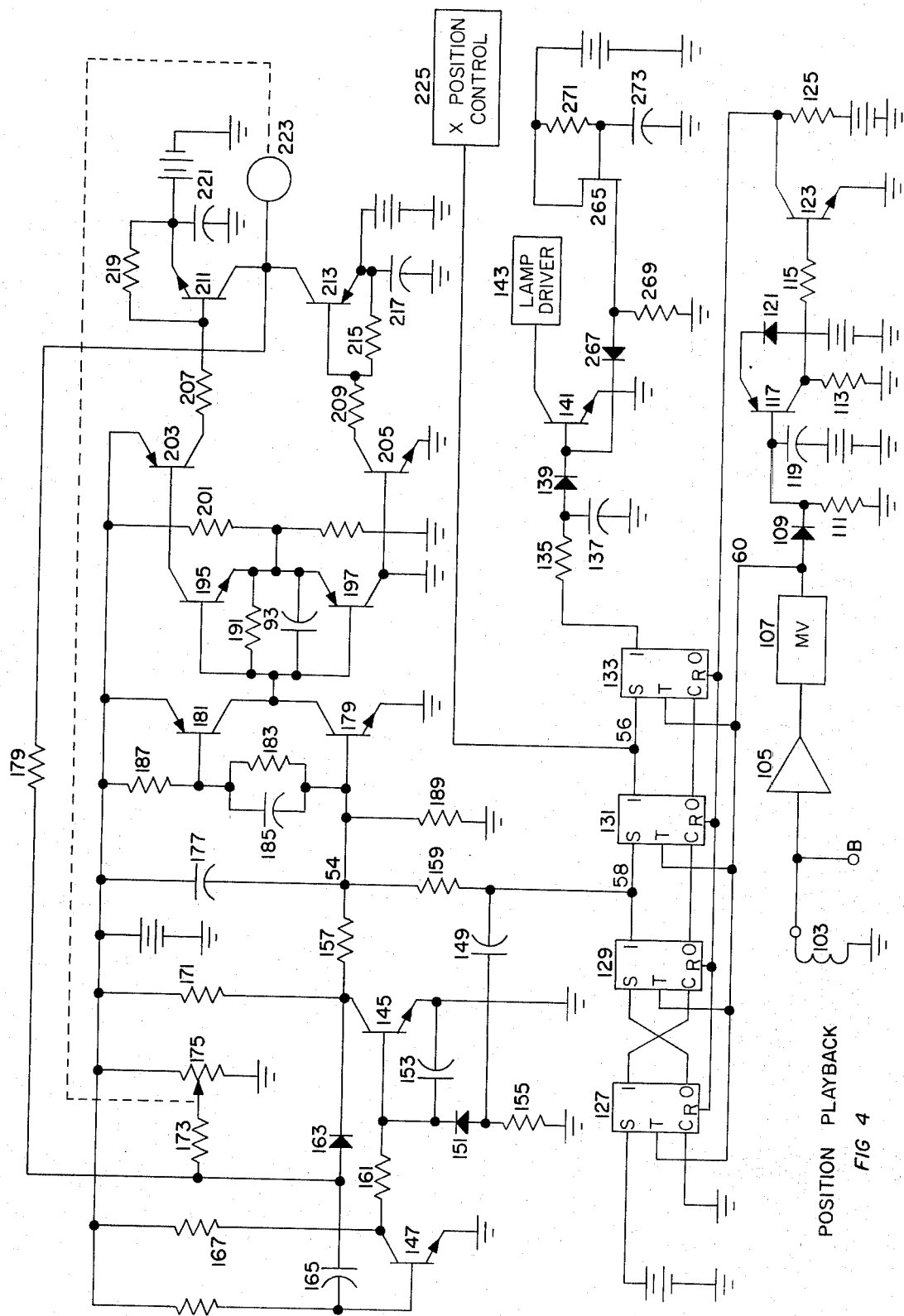
FIG. 4 is a schematic diagram of the position playback circuit in the invention.

FIG. 4 discloses circuitry for decoding the position signals and positioning the lighted arm in accordance with the preprogrammed lesson to be taught. The output from the magnetic tape is received at the playback head 103 and is amplified by a conventional integrated circuit amplifier 105. The signals thus generated are shaped by a conventional multivibrator 107 whose output feeds what is termed a synch detector circuit which includes capacitor 119, resistor 111, and diode 109. The synch detector operates such that so long as positive pulses are generated by multivibrator 107 at a certain predetermined rate, the capacitor 119 maintains a level of charge sufficient to keep transistor 117 non-conducting. If, however, the pulse output from multivibrator 107 is the long interval caused by the aforementioned fixed interval, capacitor 119 will discharge via resistor 111 rendering transistor 117 and transistor 123 conducting thereby resetting the decoding network to be described in further detail below. As is shown in the drawing, the output of multivibrator 107 is also connected to line 60 which serves as an input to the decoding network.

The decoding network consists of a shift register including a plurality of "JK" flip-flops 127, 129, 131, and 133. The JK flip-flop is described at pages 128–129 in the text Logic Design of Digital Computers by Montgomery Fister, Jr., published by John Wiley and Sons, Inc., 1958, and suffice it to say this device produces no ambiguous output states from simultaneous outputs in either the one or the zero state. Each of the JK flip-flops has set (S), trigger (T) and clear (C) inputs. The trigger input of each JK flip-flop is connected to the output of multivibrator 107 via line 60. The set input of the first JK flip-flop 127 is connected to a source of voltage as shown while the clear input for this flip-flop is connected directly to ground. The one output of JK flip-flop 127 is directly connected to the clear input of flip-flop 129 while the zero output of flip-flop 127 is connected to the set input of flip-flop 129. The one output of flip-flop 129 is connected to the set input of flip-flop 131 while the zero output of flip-flop 129 is connected to the clear input of flip-flop 131. The one output of flip-flop 133 is connected to a lamp control circuit which will be described further below. The one output of flip-flop 131 is connected to a positioning circuit for the $x$ direction while the one output flip-flop 129 is connected to a corresponding positional channel for the $y$ direction. Both positional channels will be described in further detail below. Upon the occurrence of a reset developed by the "synch detector" described above, the one outputs of all the flip-flops are set at zero, and the zero outputs are set at one. The wave forms for this circuit are shown in FIGS. 8A–8F. Upon the occurrence of the first or the synch pulse at flip-flop 127, the one output of this flip-flop goes high and remains there while the zero output goes to zero. Both outputs of flip-flop 127 will remain at these states until a new reset pulse occurs. The same synch pulse also causes flip-flop 129 to set, since its set input is initially high. Upon the occurrence of the second pulse, the trigger input of flip-flop 129 will receive a high causing the one output of flip-flop 129 to go low. The pulse duration appearing at point 58 thus represents the time interval between the synch pulse (the first pulse) and the Y pulse (the second pulse).

When the one output of flip-flop 129 goes low, the one output of flip-flop 131 simultaneously becomes high since a high was present on the set (S) and a low on the clear inputs of flip-flop 131. The third pulse will appear at the trigger input of flip-flop 131 causing its one output to go low since its set input is now low. The signal at point 56 thus represents a pulse whose width is proportional to the duration between the second and third pulses. In a like manner, the fourth pulse will cause the one output of flip-flop 133 also to go low since a low appears at the set (S) and a high appears at the clear (C) input of flip-flop 133.

The positioning circuits for both the $x$ and the $y$ channels are the same; therefore, only one of these channels will be described in detail. Turning to the $y$ positioning channel, which receives as an input, the pulse duration output of JK flip-flop 129 from point 58, a monostable multivibrator including transistors 147 and 145 whose pulse duration output is controlled by potentiometer 175 is shown. The one-shot is fired by the leading edge of the pulse output from point 58. The one-shot produces a pulse which is taken from the collector of transistor 145 and is summed with the output of flip-flop 129 in resistors 157 and 159. If both pulses are equal, no pulse appears at point 54. If, however, the output of the one-shot is longer or shorter than the output of flip-flop 129, a pulse is produced at point 54, the duration and polarity of which is, of course, proportional to the time difference between the two pulses. This time difference pulse is amplified by either transistor 179 or transistor 181 depending upon its polarity. Again as a function of polarity, current gain stages including transistors 195, 203, and 211, or 197, 205 and 213 are caused to conduct to thereby drive the y position motor 223 to a position in accordance with the output pulse difference signal.

Feedback is provided from the output to the motor 223 via a resistor 179 to the one-shot multivibrator. This feedback compensates for the dynamics of the motor; that is, when the motor is stopped, a low impedance is presented and the feedback voltage is small. However, if the motor is at high speed, the back EMF causes the feedback voltage to rise to a higher level thereby producing a lead on the firing time of the one-shot so that the speed of the motor is compensated in the one-shot.

Further in regard to the y positioning circuit shown in FIG. 4, the output of JK flip-flop 129 is conducted to the monostable multivibrator from point 58 via a differentiating circuit consisting of capacitor 149 and resistor 155. The diode 151 connected between the differentiating circuit and the base of transistor 145 serves to decouple the multivibrator from the input after the multivibrator triggers. Resistor 161 connected between the collector of transistor 147 and the base of transistor 145 serves to limit the current between these two active devices. Capacitor 153 is connected between the emitter and the base of transistor 145 for noise suppression. Resistor 167 is the collector load resistor for transistor 147. The timing of the multivibrator is controlled by a circuit including resistor 169, capacitor 165, potentiometer 175, and fixed resistor 173. More particularly, the charge on capacitor 165 is a function of the value of resistance inserted by potentiometer 175 as well as the back EMF or velocity proportional voltage which appears via feedback resistor 179. Diode 163 serves to decouple capacitor 165 when the multivibrator fires. Resistor 171 is the collector load resistor for transistor 145. Juncture 54 of the two resistors 159 and 157 is coupled to the bases of transistors 179 and 181 via a capacitive coupling consisting of capacitors 185 and 177. Resistors 189 and 187 in combination with resistor 183 are the bias control resistors for transistors 179 and 181. The pulse output from either of transistors 179 and 181 is coupled to the base of transistors 195 or 197 via an integrating or pulse stretching network consisting of resistor 191 and capacitor 193. Resistors 199 and 201 are bias resistors for the aforementioned transistors. Resistors 209 and 215 are bias resistors for transistor 213 or resistors 207 and 219 are bias resistors for transistor 211. By pass capacitors 217 and 221 are provided for noise control.

Figure 8:
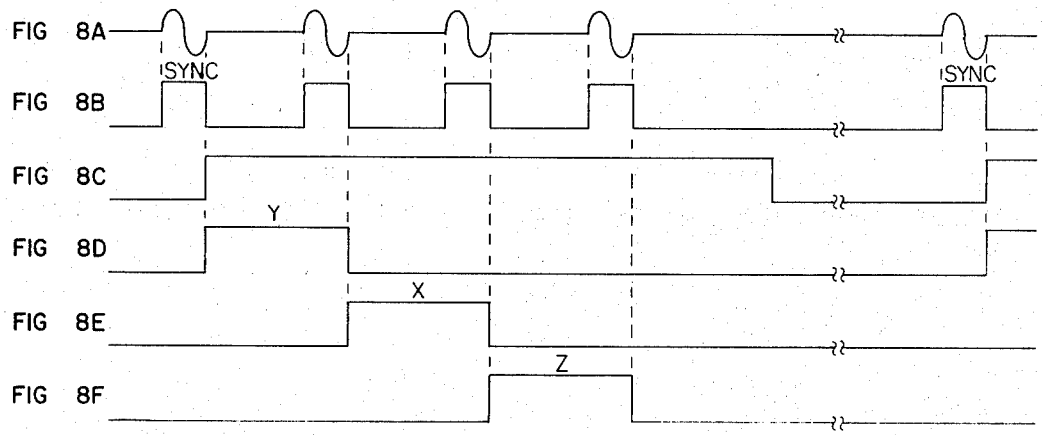

FIGS. 8A–8F show the signal waveforms at various points in the position playback circuit of FIG. 4. The output signal from the magnetic recording tape as developed by read head 103 is shown at FIG. 8A. Multivibrator 107 produces the shaped output shown in FIG. 8B. The "JK" flip-flop 127 produces the pulse shown in FIG. 8C. FIGS. 8D–8F are respectively the outputs of "JK" flip-flops 129, 131 and 133.

The output of JK flip-flop 133 controls the lamp drive circuit 143. The output interval from flip-flop 133 is integrated by an integrating circuit consisting of resistor 135 and capacitor 137. If the pulse is short, the maximum of the integrated signal will not exceed the breakdown voltage of diode 139. If the pulse is of sufficient length, however, diode 139 conducts causing transistor 141 to conduct thereby energizing the lamp. Current gain is provided by transistor 141.

Figure 5:
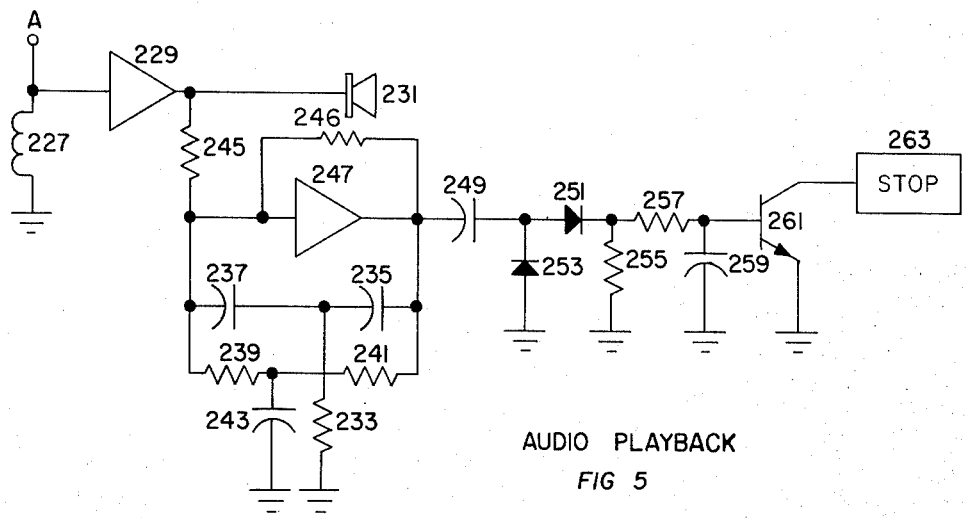
FIG. 5 is a schematic diagram of the audio playback circuit of the invention.

The audio-playback channel FIG. 5 is generally conventional consisting of appropriate amplification of the audio information to a conventional speaker 231. However, as is shown in the drawing, a 60-cycle "auto pause" detector is provided. More particularly, a 60-cycle sensitive twin T filter network is provided across a conventional integrated circuit amplifier.

In FIG. 5, the twin T network comprises capacitors 235, 237, and 243 and resistors 233, 239, and 241. Resistor 245 is the input resistor for the amplifier while resistor 246 is the feedback resistor. The output of the twin T filter network is coupled to a voltage doubler rectifying circuit including diodes 253 and 251. The output of the voltage doubler drives transistor 261 into conduction via resistor 257 to stop the tape drive. Stop control 263 is provided for this purpose.

Another feature of the present invention is the so-called answer pen. In the programming of the teaching machine, a particular question may be asked for the students such as "which element in the drawing performs a particular function?" The programmer, after asking the question, depresses the auto pause control previously described. During the playback, the auto pause signal i.e. the 60 cycle signal from AC source 98 in FIG. 2), stops the teaching machine for a fixed interval. During this interval, if the student places the answer pen on the correct element of the drawing, the machine immediately starts continuing the lesson. If the student does not locate the correct element, the pause interval continues for the remainder of its fixed duration.

Figure 9:
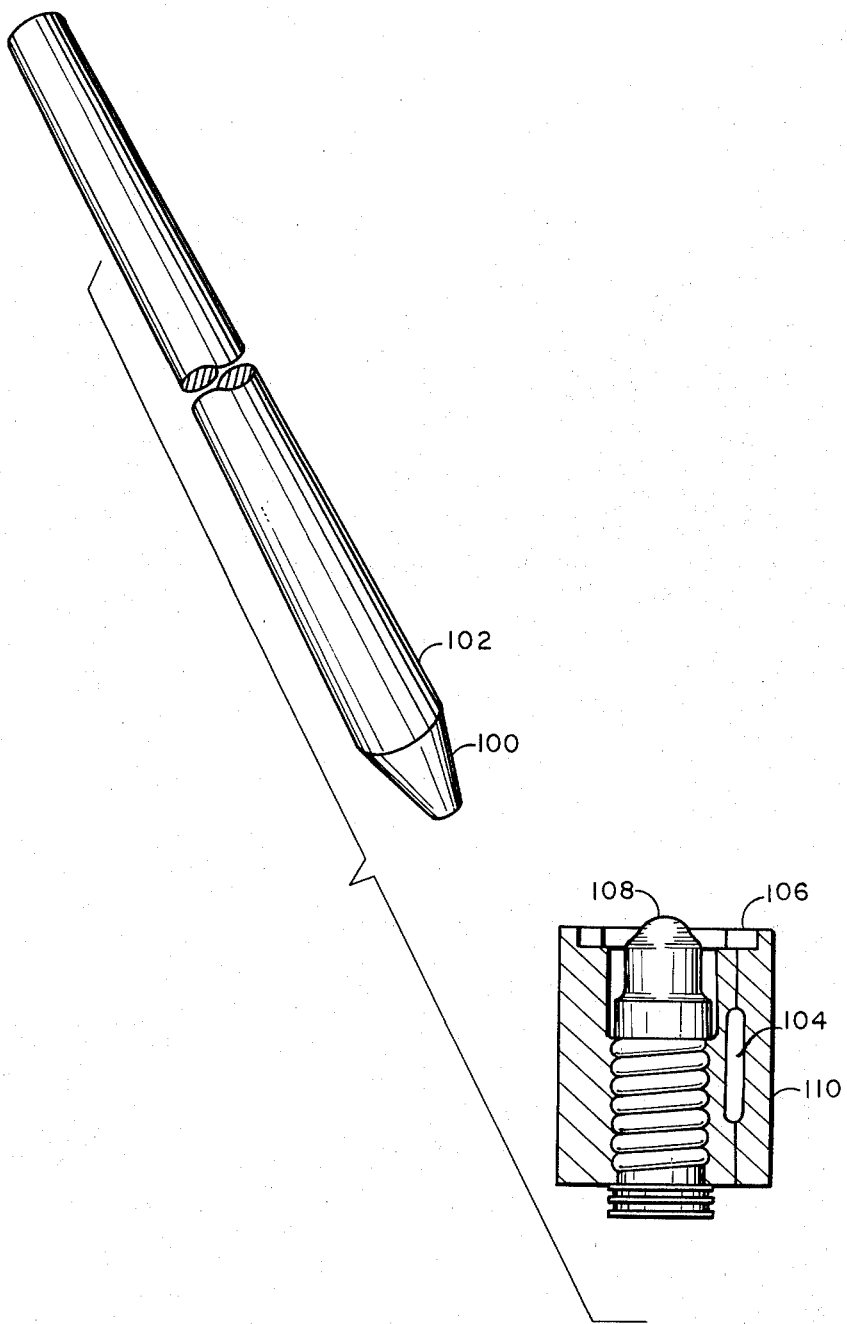
FIG. 9 is a diagram of the answer pen of the present invention.

Turning now to FIG. 9 of the drawing, the answer pen includes a tubular magnet 100 in a carrying case 102. A reed switch 104 is provided in proximity to a magnetic flux concentrator which is a circular steel washer 106. The flux concentrator, the switch and lamp 108 are mounted in a suitable housing 110. The concentrator prevents the answer pen from activating the switch unless the magnet is placed over the opening in the concentrator. The switch is connected to stop control 263 (FIG. 2) via suitable connections, not shown. The housing 110 is suitably mounted behind screen 4 (FIG. 1) for movement in vertical and horizontal directions.

We claim:
1. An instructional device comprising:
   opaque paper information bearing means;
   magnetic tape reproduce means for generating positional and audio information signals; said tape reproduce means including pulse interval detection means for producing said positional information;
   positionable means connected to said reproduce means for producing an illuminating spot as a function of said positional information;

support means located in the optical path of said spot for supporting said information bearing means and rendering visible areas of said information bearing means having indicia thereon described by said audio information; and means responsive to said audio information for producing an audible output to an operator.

2. The system of claim 1 wherein said positional information signal is generated by control signal sources representing coordinate position variations and a control interval to intermittently activate said spot.

3. An audio visual instructional system comprising:

magnetic tape record means for recording audio and positional information signals thereon;

audio signal generating means connected to said tape record means for generating an electrical signal representing said audio information;

positional signal generating means including pulse generating and coding means connected to said tape record means and further including a plurality of manually operable control sources for producing an electrical signal in the form of variably spaced pulses said pulse spacing being a function of each of said controls;

magnetic tape read means for reproducing said audio and said positional information signals;

means connected to said read means for producing audible information from said audio signal;

means connected to said record means for comparing said variable pulse spacing with predetermined intervals and generating difference signals as a function of said comparison, and means connected to receive said difference signals for executing said control functions in coordination with the presentation of said audible information.

4. The instructional device of claim 3 wherein said positional signal generating means includes a free-running source of spaced pulse type electrical signal; and said control sources include means connected to said free-running source means for varying the spacing of said pulses.

5. The instructional system of claim 4 wherein said comparison means includes shift register means for decoding said variable pulse signal into control functions for said instructional device corresponding to said control sources.

6. An instructional system for providing corresponding audio and tutorial information respecting a particular illustration of material to be taught comprising:

magnetic tape record/reproduce means for recording and reproducing related audio and positional information signals;

means connected to said record/reproduce means for generating audio information signals for recording;

means connected to said record/reproduce means for generating a variably spaced pulse type electrical signal, the variations in pulse spacing being indicative of positional information;

positionable means connected to said reproduce means for producing an illuminating spot as a function of said positional information;

support means located in the optical path of said illuminating spot for producing a visible indication of portions of an information bearing means having indicia thereon described by said audio information; and means responsive to said audio information for producing an audible output to an operator.

7. An instructional device employing magnetic tape recording techniques comprising:

magnetic tape recording means for recording narrative audio information and related corresponding positional information on magnetic recording media;

positional signal generating means connected to said tape recording means including oscillation and coding means for producing pulse type signals having a first interval between pulses, manually adjustable means connected to said coding means for adjusting the intervals between said pulses as a function of desired position;

means responsive to said recorded information for translation said audio information into audible narrative; and means including pulse interval detection means for producing said positional information and visible indications correlated to said audio information.

* * * * *